United States Patent [19]
Moriyama et al.

[11] B 3,927,414
[45] Dec. 16, 1975

[54] AUTOMATIC CAMERA SETTING APPARATUS

[75] Inventors: Itsuki Moriyama; Shigeo Enomoto, both of Tokyo, Japan

[73] Assignee: Asahi Kogaku Kogyo Kabushiki Kaisha, Japan

[22] Filed: Nov. 29, 1973

[21] Appl. No.: 420,148

[44] Published under the Trial Voluntary Protest Program on January 28, 1975 as document no. B 420,148.

[30] Foreign Application Priority Data
Nov. 30, 1972  Japan.............................. 47-120008

[52] U.S. Cl. .................... 354/195; 354/293; 355/55
[51] Int. Cl.[2] ......................G03B 3/00; G03B 13/02; G03B 27/52
[58] Field of Search............. 95/11 R, 44 R; 355/56, 355/55; 354/195, 293

[56] References Cited
UNITED STATES PATENTS

| | | | |
|---|---|---|---|
| 3,052,156 | 9/1962 | Blatherwick | 355/62 |
| 3,625,607 | 12/1971 | Bravenec | 355/56 |
| 3,735,686 | 5/1973 | Brewer et al. | 95/44 R |

FOREIGN PATENTS OR APPLICATIONS
902,909  8/1962  United Kingdom................... 355/56

*Primary Examiner*—Richard A. Wintercorn
*Attorney, Agent, or Firm*—Steinberg & Blake

[57] ABSTRACT

Apparatus for automatically setting a camera to execute photographing operations each in accordance with specified photographic information. The apparatus includes a reference member and a movable member which supports the camera and which can move with respect to the reference member. A group of position detecting devices are each connected partly to one and partly to the other of these members, with at least one part of each detecting device capable of being preset for producing a signal when the camera optical axis is aligned with an object to be photographed. A camera control is preset with the photographic information corresponding to each object for which the photographing operations are to be executed. The camera control can automatically set the camera with the specified photographic information in response to the signal from the position detection devices.

10 Claims, 4 Drawing Figures

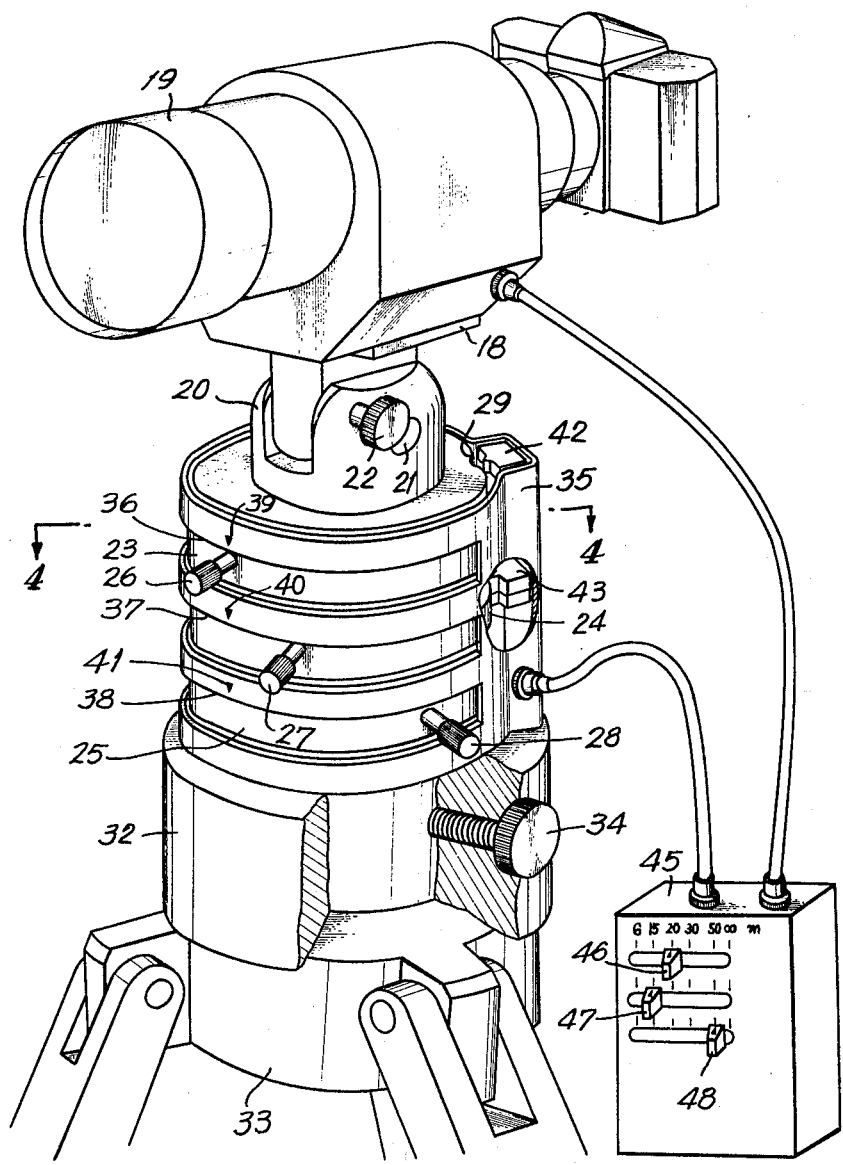

AUTOMATIC CAMERA SETTING APPARATUS

BACKGROUND OF THE INVENTION

The present invention relates to cameras.

In particular, the present invention relates to an apparatus for automatically setting a camera to execute photographing operations in accordance with specified photographic information, when the camera has its optical axis aligned with an object to be photographed.

As is well known, some cameras use a preset type lens barrel. The lens barrel can be automatically set to various photographic conditions according to preset requirements. Such photographic conditions can include a focusing position, focal length, diaphragm aperture and others. Each of the photograph conditions are preset, and by operating switches the lens barrel is automatically set in accordance with the preset photographic condition. For each photographic condition, it is usual to provide a separate switch. In this manner, in order to set the lens barrel, it is necessary to operate a number of the switches, and the operator must be familiar with the switches to achieve a specific photographing operation.

If the camera utilizing this type of lens barrel is to perform photographing operations on a plurality of different objects, each of which is located in a different direction, and each of which requires different photographic conditions, it becomes extremely difficult for the operator to remember the specific photographic conditions required for each of the different plurality of objects in the different directions. For example, if a first object located at a distance of 10 m. away from the camera requires a focal length of 200 mm. and a diaphragm value of F22, each of these preset photographic conditions must be controlled with switches when the camera is aimed at the first object. If a second object is subsequently to be photographed and is located at a distance of 2 m. from the camera and requires a focal length of 100 mm. with a diaphragm value of F4, then the operator must subsequently control the switches in accordance with these latter settings when the camer photographs the second object. With the camera mounted on a universal head so that the camera can be rotated in various directions to photograph objects, it is necessary for the operator to direct the camera to each object and at the same time, before releasing the shutter, to operate the several switches thereby setting the camera in accordance with the preset photographic conditions for the particular object to be photographed. Because the procedure is complicated, and the number of photographic settings quite numerous, it is frequent that operational errors occur.

SUMMARY OF THE INVENTION

It is accordingly a primary object of the present invention to provide apparatus for controlling the operation of a camera in a manner which will avoid the aforementioned drawbacks.

In particular, it is an object of the present invention to provide an apparatus which detects alignment of the optical axis of the camera with the object to be photographed and then automatically sets the camera in accordance with specified photographic information.

Another object of the present invention is to provide an apparatus which can set a camera automatically to a plurality of preset photographic conditions corresponding to a plurality of objects to a photographed, wherein it is only needed to direct the camera to the object and the apparatus, upon detecting the alignment of the camera with the object, automatically sets the camera in accordance with the corresponding preset photographic conditions.

According to the invention, an apparatus is provided for detecting preset positions at which a camera should execute photographing operations each in accordance with specified photographic information. The apparatus includes a reference member and a movable member which supports the camera and can move with respect to the reference member. A position detecting means is connected partly to one and partly to the other of these members. At least one of these members is capable of being preset to cause the detecting means to give automatically an operating signal when the camera is displaced to a given position. A camera control means is provided for automatically setting the camera with the specified photographic information. The camera control means is preset to store the photographic information and responds to the signal from the detection means to set the camera with the photographic information.

BRIEF DESCRIPTION OF DRAWINGS

The invention is illustrated by way of example in the accompanying drawings which form part of this application and in which:

FIG. 3 is a perspective view of one possible system according to the present invention.

DESCRIPTION OF PREFERRED EMBODIMENT

Although the present invention can be utilized to detect a larger number of objects situated at a plurality of different locations, merely by way of example, operations in connection with three objects located in three different directions respectively at different distances from the camera will be described. Also, although numerous types of camera settings can be automatically made as well as numerous combinations of such settings, merely by way of example the following description will describe automatically setting the focusing position of the camera, or in other words the distance between the camera and the object.

Figure 1:
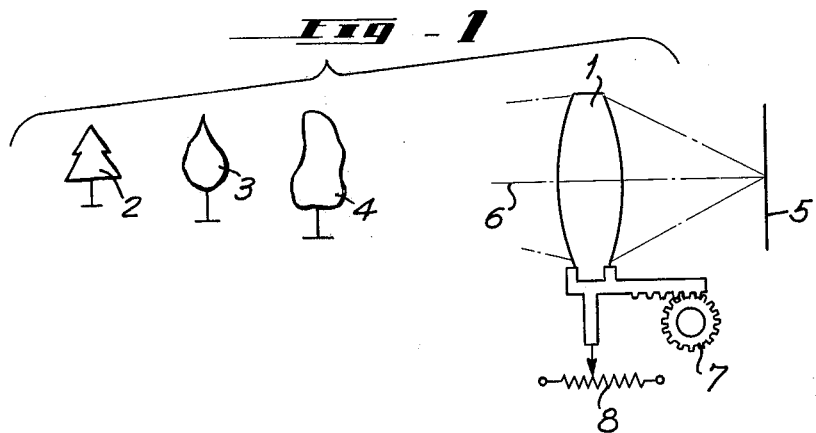
FIG. 1 is a schematic illustration of the mechanical principles of the present invention.

FIG. 1 is a schematic illustration of the principles of the present invention as applied to a focusing device. There is shown an objective 1 which can typically represent a group of lenses adapted for forming images of a plurality of objects, identified as 2, 3 and 4, whose images are to be focused on a film plane 5. The objects 2, 3 and 4 would typically be located at different distances in different directions. The lens 1 is movable back and forth along its optical axis 6 to permit focusing of images of the objects 2, 3 and 4 on the film plane 5. An electric motor 7 is utilized for moving the lens along its optical axis to achieve proper focusing. As the motor 7 operates to move the lens 1 along its optical axis, the movement also controls the setting of a control potentiometer means 8 so that changes in the potentiometer correspond to changes in the setting of the lens 1.

Figure 2:
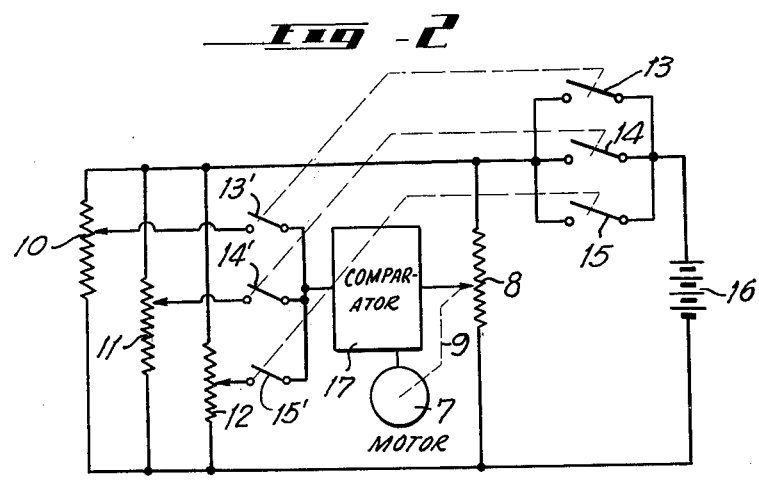
FIG. 2 is a wiring diagram of the electrical circuitry of the present invention.

Referring now to FIG. 2, there is shown a wiring diagram explaining the operation of the electrical circuitry of the present invention. The electric motor 7 forms part of a control means for moving the lens and is shown by means of the dotted line 9 coupled to the potentiometer 8 of the control means. As the electric motor causes the lens to move along its optical axis, the reading or setting of the potentiometer is synchronously changed. Manually adjustable potentiometers 10, 11 and 12 form part of the control means and are utilized by the operator for presetting and storing the desired photographic information corresponding to the three different objects to be photographed. The potentiometers 10, 11 and 12 are connected through the parallel combination of switches 13, 14, and 15 to a battery 16. The control potentiometer 8 is connected in parallel with the potentiometers 10, 11, and 12. Switches 13', 14' and 15' which are respectively in series with potentiometers 10–12 are mechanically connected to switches 13, 14, and 15 respectively to close simultaneously therewith. Thus, switches 13', 14' and 15' are connected respectively to the outputs of the operating potentiometers 10, 11, and 12. The other end of the switches 13', 14', and 15' are connected together and feed one input of a comparator 17, the other input of which is connected to the output of the control potentiometer 8. Motor 7 is also connected to the comparator 17.

In operation of the above described circuit, the operator sets the photographic information corresponding to the distances to the three objects to be photographed located at three different directions onto the potentiometers 10, 11, and 12. In the present example, such information relates to the focusing position. When the operator wants to photograph the first object, switch 13 is closed thereby energizing the circuit from the battery 16 and simultaneously causing switch 13' to close in synchoronism therewith. Switches 14 and 15 as well as 14' and 15' remain open. The output of potentiometer 10 is compared with the output of the control potentiometer 8 by means of the comparator 17 which then causes the motor 7 to operate thereby driving the lens either forward or backward along the optical axis until the output value of the control potentiometer 8 becomes equal to the output value of the preset potentiometer 10. In the same manner, when the second of the objects is to be photographed, switch 14 is closed to energize the circuit from the battery 16 and likewise closes switch 14' in synchronism therewith. The output from the control potentiometer 8 is then compared with the putput from the preset potentiometer 11 by the comparator 17. Similarly, with regard to the third object to be photographed, switch 15 is closed and the information stored by preset potentiometer 12 is compared with the output of the control potentiometer 8, with the motor 7 driving the objective 1 along the optical axis until the output of the control potentiometer 8 equals the output of the potentiometer 12.

Utilizing the circuitry shown in FIG. 2, it is seen that the photographic information such as the focusing position is preset on the operating potentiometers for each of the objects to be photographed. When the camera then has its optical axis aligned with one of the objects, the switch corresponding to this object is closed and the camera will automatically be set with the proper distance required for focusing. Although the circuit has been described in connection with focusing, it is understood that similar arrangements can be incorporated in the operation section of a lens barrel so that the focal length of the lens, the diaphragm aperture size, or other camera controls can be automatically set to the preset values by operating a single switch once the camera is directed towards the object to be photographed.

Figure 4:
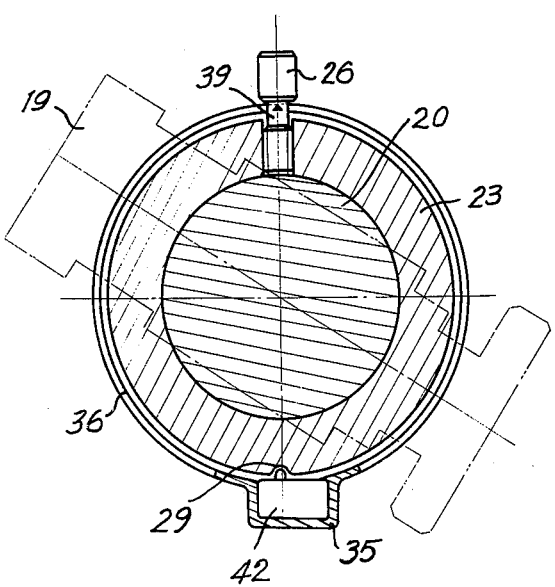
FIG. 4 is a sectional view taken along line 4—4 of FIG. 3 in the direction of the arrows.

Referring now to FIGS. 3 and 4, there is shown one embodiment of the invention wherein the above described operation is utilized in conjunction with a camera mounted on a universal head. A camera 19 having a preset type of lens barrel is positioned on support 18 which is pivotally supported on a vertical shaft 20 by means of horizontal pin 21. The vertical shaft 20 can rotate about its axis to permit the camera to rotate therewith in a horizontal plane. The camera 19 and support 18 can also pivot around the pin 21 in a vertical plane. Clamp 22 is utilized to hold the camera 19 in a selected position in the vertical plane.

A plurality of rings 23, 24 and 25 are rotatably mounted around the vertical shaft 20. The number of rings equals the number of object positions detectable by the camera, and by way of example, three such positions can be detected. Each of the rings 23, 24, and 25 is provided with a notched portion 29 at the outer circumference thereof. The rings can be securably fixed to the vertical shaft 20 at a given angular position by means of the respective clamps or set screws 26, 27, and 28. A reference member or means 32 is fixedly connected to the tripod 33. The vertical shaft 20 and rings 23–25 form a movable means which can be held in a stationary position with respect to the reference means 32 by the clamp 34 after the movable means has been moved (around the axis of shaft 20) with respect to reference means 32.

The upper portion of the reference means 32 forms a common housing 35 for housing the rings 23, 24 and 25. The housing 35 is formed with slots 36, 37 and 38 through which the clamps 26, 27, and 28 extend to render rings 23–25 accessible for adjustment. The slots extend around almost the entire housing 35 permitting the clamps and rings to rotate almost completely around the shaft 20. The housing 35 carries indicia markings 39, 40 and 41 corresponding to each of the three clamps 26, 27 and 28 for positioning the rings. Switches 42 and 43 associated respectively with rings 23 and 24 and a further switch (not shown) associated with ring 25, are secured to the housing 35 and located at the same elevations as the rings and the notched portions 29 thereof. The switches 42, 43 and 44 include protruding tongue or operating portions normally held in retracted positions by the rings, respectively, and when confronting the notched portions 29 can extend into the notches. The switches 42, 43 and 44 are arranged to be in a conducting state only when the operating projections thereof extend into the respective notched portions 29 and to remain in a non-conducting state at all other times. During rotation of the rings 23, 24 and 25 about the axis of the vertical shaft 20, when the notched portions reach the respective switches 42, 43 or 44, the respective switches will close and conduct. The position at which the notch will confront the respective switch is determined by the location of the object to be photographed.

Each switch and notched portion cooperating therewith forms a detecting means connected in part to the movable means, formed by a ring and shaft 20, and in part to the reference means 32, 35 for automatically producing a signal when the switch closes in response to being operating by the means formed by the notch portion. In the illustrated example there are three units each composed of a reference means, movable means and a detecting means.

The switches, two of which are shown in FIG. 3, correspond to the switches 13, 14, and 15 previously described with respect to FIG. 2. The manually adjustable potentiometers 10, 11 and 12 of FIG. 2 are housed for convenience in a control box 45 (FIG. 3). The respective potentiometers can be preset by means of the respective operating levers 46, 47 and 48 in accordance with specified photographic information relating to each of the objects to be photographed in each of the different directions.

In operation of the device shown in FIGS. 3 and 4, the operator turns the camera 19 to a position where the optical axis of the camera is aligned with the first object to be photographed. The clamps 22 and 34 are then secured holding the camera 19 in this position. The first ring 23 is then turned around shaft 20 until the clamp 26 is in alignment with the index 39 and the clamp 26 is then tightened. By tightening the clamp 26, the disc 23 becomes securably attached to the vertical shaft 20 to rotate therewith. When the clamp 26 is in alignment with the index 39, the notch 29 of ring 23 receives the operating projection of the switch 42 so that the latter closes. The objective 1 is now focused on the object and operating lever 46 at the control box 45 is then set manually at the same setting as the focusing ring of the objective. The clamps 22 and 34 are then loosened and the camera is directed towards the second object to be photographed. Ring 23 now turns with shaft 20. Again the clamp 34 is tightened and the above procedure is repeated for the ring 24 by securing the clamp 27 in alignment with the index 40 and setting the operating lever 47 in accordance with the distance setting at the objective. A similar procedure is carried out with respect to a third object to be photographed utilizing the ring 25, the clamp 28, the index 41 and the potentiometer lever 48.

When the camera, together with the vertical shaft 20 is then rotated in a horizontal plane, as the camera 19 reaches a position directed towards the first object to be photographed, the notched portion 29 of the ring 23 receives the spring actuated operating portion of the switch 42 so that the latter switch is actuated to become conductive. Actuation of the switch 42 causes the information preset on the storing potentiometer 10 by means of the operating lever 46 to automatically set the camera 19. This setting is accomplished, as was described in connection with FIG. 2, by comparing the output of the potentiometer 10 within the control box 45 with control potentiometer 8 operated by means of motor 7 setting the camera 19 automatically. In the same way similar systems can be provided for automatic setting of other factors. After the camera has been automatically set, the exposure is made, and then the camera is again rotated until the direction of the second object is reached, whereupon the ring 24 now has its notched portion confronting and receiving the operating member of the switch 43, whereupon the switch 43 is actuated to provide the signal causing the information stored in the potentiometer 11 by means of the operating lever 47 to automatically set the camera. Similarly, when the camera is directed towards the third object to be photographed, the camera will automatically be set with the corresponding photographic information.

It is appreciated that with this apparatus, it is possible to achieve automatic focusing of the camera merely by directing the camera toward the object to be photographed. In the case where a plurality of objects to be photographed, and each object is located in a different direction, the switches 42, 43 and 44 are sequentially actuated depending on the directions of the objects. In addition to utilizing the apparatus for automatic focusing of the camera, the apparatus can be used to control the focal length of the lens or the diaphragm setting. This information can be set on additional switches so arranged as to be operative in association with the switches 42, 43 and 44 whereby the camera can be automatically set with numerous photographic information at each position. The photographic information can include the focusing position, the focal length and the diaphragm setting. All of the automatic settings are achieved by merely directing the camera towards the object to be photographed.

In the embodiment shown and described in connection with FIGS. 3 and 4, switches 42, 43 and 44 are utilized as part of the position detecting means and are arranged on the reference member, namely the cover 35. The notched portions 29 serve as the other part of the position detecting means and are located in conjunction with the movable means, since the rings operate together with the vertical shaft, which is rotatably mounted within the reference member. The notched portions 29 are capable of being externally set corresponding to the various camera directions by means of the rings 23, 24 and 25 and the clamps 26, 27 and 28. This arrangement, however, can be altered in that position detecting means may include lead relays and magnets or resistors and contacts. Alternately, the members including the notched portions may be arranged on the reference means and the members including the switches may be associated with the movable means, so long as at least one of these members can be set externally to the required position.

In the embodiment described, the position detecting means, has been described to operate with respect to horizontal turning of the camera around a vertical axis. It is also possible to provide for position detecting means operating in connection with turning movement of the camera around a horizontal axis. Referring again to FIG. 3, the vertical shaft 20 can be utilized as a second reference means and the support 18 can serve as the second movable means, in that it is free to rotate in a vertical plane with respect to the shaft 20, by pivoting about the pin 21. A group of position detecting means can be mounted in part on the shaft 20 and in part on the support 18 in such a manner that at least one of these parts can be set externally. In this way the second position detecting means can operate at preselected angular positions of the camera 19 with respect to a horizontal axis.

The apparatus can thus be arranged to combine the functions of the vertical and horizontal detecting devices so that the camera performs the photographing operations only when a particular pair of vertical and horizontal position detecting devices operate simultaneously. In this case automatic setting of the camera will occur only when the camera is oriented both vertically and horizontally with respect to a given object, since the switches of a pair of detecting means will be connected in series so that both must be simultaneously closed to achieve the signal to start the operation of the control means.

Utilizing apparatus in accordance with the invention, the camera can be automatically set to the preset photographic conditions in an easy and reliable manner merely upon directing the camera to any one of a plurality of objects, each having a different photographic requirements. If the vertical shaft 20 is arranged to be rotatably driven around its axis by an electric motor, in response to operation of the switches of the detecting means, it is possible to have a remote control of the camera so that it turns automatically to an object located at any position. In addition, it is possible to have the camera driven to sequentially photograph a series of the objects. When a plurality of objects are to be photographed individually in a sequential manner, it is possible to automatically carry out this sequential operation, including the setting of the camera automatically, as well as the automatic shutter release on the camera. These operations can be automatically carried out either when an operator directs the camera himself or utilizing a motor driven camera, in either case with automatic exposure control when the camera is directed to each of the objects to be photographed. The shutter button or shutter tripping operation of the camera can be arranged to operate in association with the switches 42, 43 and 44.

What is claimed is:

1. In a photographic apparatus for photographing an object automatically with at least one predetermined camera setting when a camera has its optical axis displaced from a location out of line with to a location in alignment with the object, a pair of means consisting of a reference means and a movable means movable with respect to said reference means, said movable means carrying the camera for moving the camera with said movable means to displace the optical axis of the camera from a location out of line with an object to be photographed to a location where said optical axis is in line with the object to be photographed, manually adjustable detecting means, connected in part to one and in part to the other said pair of means, for automatically providing an operating signal when the camera is displaced to a position where its optical axis is aligned with the object, and camera control means for storing said predetermined setting, said control means being operatively connected with the camera and said detecting means for responding to said signal to automatically set the camera with said predetermined setting.

2. The combination of claim 1 and wherein said detecting means includes a pair of members for producing said signal when said members are in a given position relative to each other, said members being respectively connected to said reference and movable means with one of said members being manually adjustable with respect to the means to which it is connected while the other member remains fixed with respect to the means to which it is connected.

3. The combination of claim 2 and wherein one of said members of said detecting means is an electrical switch and the other is a switch actuator therefor.

4. The combination of claim 1 and wherein said camera control means includes a manually adjustable potentiometer for storing said predetermined setting.

5. The combination of claim 4 and said control means further including motor means for adjusting the camera in accordance with the predetermined setting, a control potentiometer coupled to said motor means and operated thereby in conjunction with the adjusting of the camera, and comparison means connected between said potentiometers for comparing the setting on the control potentiometer with the setting on the manually adjustable potentiometer and for controlling the motor means to operate in a given direction and to a given extent until the settings of potentiometers have a given relationship.

6. The combination of claim 1 and wherein for photographing a plurality of objects automatically respectively with predetermined camera settings when the camera has its optical axis sequentially aligned with the plurality of objects, the combination includes a plurality of units each composed of said reference means, movable means, and detecting means, each have their detecting means operatively connected with said camera control means, with the latter storing the predetermined settings required for the plurality of objects, respectively, and said control means being operatively connected with the camera to respond to the signals sequentially provided by the plurality of detecting means for automatically setting the camera with the predetermined settings required by the plurality of objects, respectively.

7. The combination of claim 6 and wherein the plurality of reference means include a common housing formed with a plurality of slots corresponding to the number of reference means, said plurality of movable means including a rotary shaft, common to all of said movable means and extending through the housing and carrying the camera, and a plurality of rings respectively accessible through said slots and turnable about said shaft, said rings respectively carrying means for fixing them to said shafts at selected angles with respect thereto in accordance with the plurality of predetermined settings, said detecting means of said plurality of units including a plurality of switches carried by said common housing and respectively aligned with said rings, and a plurality of means carried by said rings for respectively operating said switches, so that by angularly positioning said rings with respect to said shaft the latter and camera can be turned to align the optical axis of the camera with the objects to be photographed while successively activating the switches as the camera optical axis is successively aligned with the objects to be photographed, the operation of said switches providing said signals to which said control means responds.

8. The combination of claim 7 and wherein said control means includes a plurality of individually adjustable potentiometers for respectively storing said predetermined settings, motor means operatively connected with the camera for adjusting the latter in accordance with said predetermined settings, control potentiometer means coupled to said motor means and operated thereby in conjunction with the adjusting of the camera, and comparison means connected between said adjustable potentiometers which store said settings and said potentiometer means for comparing the setting of the latter with the settings of said adjustable potentiometers which store said setting and for controlling the motor means to operate in a given direction and to a given extent until the settings of said potentiometer means and in the sequence of photographing the objects said plurality of adjustable potentiometers have a given relationship.

9. The combination of claim 8 and wherein said potentiometer means is a single potentiometer.

10. The combination of claim 8 and wherein said potentiometer means is permanently coupled with said comparison means while said switches of said plurality of detector means are respectively connected in series with the plurality of adjustable potentiometers for sequentially rendering the latter operable in accordance with the sequence of photographing of the plurality of objects.

* * * * *